United States Patent
Highbloom (10) Patent No.: US 8,078,525 B2
(45) Date of Patent: Dec. 13, 2011

(54) SYSTEM AND METHOD FOR PROVIDING SERVICES TO A CLIENT

(75) Inventor: Lawrence Highbloom, Wynnewood, PA (US)

(73) Assignee: Vintek, Inc., Philadelphia, PA (US)

(*) Notice: Subject to any disclaimer, the term of this patent is extended or adjusted under 35 U.S.C. 154(b) by 84 days.

(21) Appl. No.: 11/796,098

(22) Filed: Apr. 26, 2007

(65) Prior Publication Data

US 2007/0282738 A1  Dec. 6, 2007

Related U.S. Application Data

(60) Provisional application No. 60/795,039, filed on Apr. 26, 2006.

(51) Int. Cl.
*G06Q 40/00* (2006.01)

(52) U.S. Cl. .................. 705/38; 705/35; 705/39

(58) Field of Classification Search ............. 705/35, 705/38, 39
See application file for complete search history.

(56) References Cited

U.S. PATENT DOCUMENTS

| | | | |
|---|---|---|---|
| 3,946,217 A | | 3/1976 | Tsujikawa et al. |
| 4,736,294 A * | | 4/1988 | Gill et al. .................. 705/38 |
| 5,323,315 A | | 6/1994 | Highbloom |
| 5,623,403 A | | 4/1997 | Highbloom |
| 5,774,872 A | | 6/1998 | Golden et al. |
| 5,799,283 A | | 8/1998 | Francisco et al. |
| 5,899,978 A | | 5/1999 | Irwin |
| 5,940,812 A * | | 8/1999 | Tengel et al. .................. 705/38 |
| 5,950,169 A | | 9/1999 | Borghesi et al. |
| 6,076,064 A | | 6/2000 | Rose, Jr. |
| 6,259,354 B1 | | 7/2001 | Underwood |
| 6,263,320 B1 * | | 7/2001 | Danilunas et al. ............. 705/35 |
| 6,850,902 B1 | | 2/2005 | Finch |
| 6,898,574 B1 | | 5/2005 | Regan |
| 6,904,412 B1 | | 6/2005 | Broadbent et al. |

(Continued)

OTHER PUBLICATIONS

"ATC Automotive Titling Corporation". Automotive Titling Corporation. Jan. 2, 2008 www.autotitling.com/default.asp, 2 pages.

(Continued)

*Primary Examiner* — Thomas Dixon
*Assistant Examiner* — Gerald C Vizvary
(74) *Attorney, Agent, or Firm* — Flaster/Greenberg PC (57) ABSTRACT

A method is provided for a service provider to automate service tasks for a client where the client would otherwise need to perform the tasks. The method can be implemented using computers and the internet, where a web site is provided that the client can access for information and/or calculations. Where the client is a lender making a loan to a borrower, who wishes to purchase real or personal property from a seller, the client provides customer information to the service provider who in turn provides documents for execution by the borrower and the seller. After auditing the information received, the service provider advises the client whether to make the loan. If the loan is made, the client disburses proceeds to the seller and/or to a pre-existing lienholder and an amount to the service provider, who sends information to a governmental entity for recording a lien on the property.

22 Claims, 4 Drawing Sheets

U.S. PATENT DOCUMENTS

| | | | |
|---|---|---|---|
| 6,985,886 B1 | 1/2006 | Broadbent et al. | |
| 7,734,530 B1 | 6/2010 | Domingue, Sr. et al. | |
| 7,908,210 B2 | 3/2011 | Huber et al. | |
| 2001/0011221 A1* | 8/2001 | Underwood | 705/1 |
| 2002/0032626 A1* | 3/2002 | DeWolf et al. | 705/35 |
| 2003/0041019 A1* | 2/2003 | Vagim et al. | 705/38 |
| 2005/0197953 A1 | 9/2005 | Broadbent et al. | |
| 2005/0222947 A1* | 10/2005 | Regan | 705/39 |
| 2005/0288952 A1 | 12/2005 | Davis | |
| 2006/0064375 A1* | 3/2006 | Campagna et al. | 705/39 |
| 2008/0281734 A1 | 11/2008 | Longe et al. | |

OTHER PUBLICATIONS

"ELT Brings Many Benefits for Motor Vehicle Agencies". *VINtek View* Fall 2002: vol. 9, No. 1, pp. 1-4.

"Quality Assurance Benefits Motor Vehicle Agencies". *VINtek View* Winter 2003: vol. 9, No. 2.

"Preparing to Build a First Class ELT Program". *VINtek View* Spring-Summer 2003: vol. 9, No. 3.

"States are Getting a Big Return on their ELT Investment". *VINtek View* Winter 2004: vol. 9, No. 4.

U.S. Appl. No. 11/733,055, Domingue, Sr. et al.

* cited by examiner

SYSTEM AND METHOD FOR PROVIDING SERVICES TO A CLIENT

CROSS-REFERENCE TO RELATED APPLICATIONS

Priority is claimed to U.S. Provisional Patent Application Ser. No. 60/795,039 filed by the inventor on Apr. 26, 2006, which is incorporated by reference.

BACKGROUND OF THE INVENTION

This invention pertains to providing services to a client, and more particularly to providing services to a lender with respect to a loan for purchase of a vehicle and recording a certificate of title to the vehicle.

Lenders, such as banks, credit unions and finance companies, loan money to consumers for the purchase of assets or items of personal property, particularly a vehicle, such as an automobile, motorcycle or boat. The asset purchased typically serves as collateral to secure the loan. A lender publicly records its collateral position regarding the asset by filing a lien on a certificate of title evidencing ownership of the asset. This public filing and the subsequent notation of the lien on the face of the certificate of title is required to provide notice to third parties of the presence of the lien against the asset evidenced by the certificate of title. The public filing of the lien varies by jurisdiction in terms of method and timing. Some jurisdictional public lien filing methods result in the lender taking possession of the certificate of title with its lien noted on the face of the certificate of title, while other jurisdictional public lien filing methods result in the purchaser taking possession of the certificate of title with the lender's lien noted on the face of the certificate of title. The service of offering loans is labor intensive, and preparing and tracking the various documents required to publicly record the lien of the lender in these types of transactions is tedious and time consuming.

U.S. Pat. No. 6,904,412, issued to Broadbent, et al., and incorporated by reference, describes a lender's work flow in processing a loan and securing the loan amount, although for real estate transactions rather than for purchases of personal property. Broadbent, et al. describe an automated compliance engine that generates a list of tasks which can be used to control and drive the process of handling a mortgage loan application to completion and to monitor the completion of the tasks.

U.S. Pat. No. 6,076,064, issued to Rose, Jr. and incorporated by reference, provides information concerning titles to vehicles, vehicle identification numbers and state departments of motor vehicles that regulate the sales of vehicles. Rose, Jr. describes a centralized computer data base(s) operating in a "client-server" computer environment for use in creating a title history file, where the centralized data base is connected to various authorized agents such as insurance agents and car dealers, and to governmental agents such as a department of motor vehicles and tax collecting entities.

BRIEF SUMMARY OF THE INVENTION

The present invention provides a method for serving a client, including providing a computerized calculation system that the client can access to make a calculation, prompting the client to enter information into the computerized calculation system concerning a transaction that the client wishes to make with a third party, preparing documents for the third party, sending the documents to the third party, receiving the documents back from the third party, and advising the client concerning the transaction. The client is preferably a lender and the transaction is preferably a loan. The third party is preferably a borrower, who wishes to purchase something from a seller or who wishes to refinance an existing loan. The client is served by handling various documents associated with the transaction and automating the transaction as much as possible.

In an overview of one embodiment of the present invention, a service provider provides loan application and public lien recordation filing and monitoring services for a lender. Although applicable to real property transactions, the service provider more particularly provides certificate of title application and lien recordation filing and monitoring services for personal property transactions, particularly concerning the purchase of vehicles such as automobiles, motorcycles, recreational vehicles, trucks and boats. The service provider and the lender cooperatively work together using internet or web-based software tools and applications. In a preferred embodiment, a method is provided for financing vehicle sales, particularly for financing of consumer person-to-person vehicle sales.

In one embodiment of the present invention, a method is provided for processing a loan application to finance the purchase of a vehicle and to secure the loan by placing a lien on the vehicle. The process is initiated by a person, a buyer/borrower, who asks a bank, credit union, finance company or the like, a lender, to loan him or her money to purchase a vehicle from a person who wants to sell the vehicle, a seller. In a preferred embodiment, the borrower and the seller are each individuals, although the seller may be a dealer, a fleet organization or a leasing company. The borrower and the lender negotiate and agree on terms for a loan to finance the purchase of the vehicle. The lender initiates a work request to the service provider, preferably using an internet portal that the service provider provides. The service provider prepares a borrower information packet, sends it to the borrower, prepares a seller information packet and sends it to the seller. The borrower provides information requested in the borrower information packet and returns it to the service provider. Likewise, the seller provides information requested in the seller information packet and returns it to the service provider.

In one embodiment of the present invention, the borrower and the seller information packets are delivered as paper documents by a courier service. In another embodiment, the service provider supplies an internet website which presents to borrowers an electronic document version of the borrower package and presents to sellers an electronic version of the seller package, which eliminates the requirement of the service provider to send borrower and seller packages to borrowers and sellers. The borrower and seller complete electronic versions of the forms contained within the borrower and seller packages on a web page and upon completion of the electronic forms the borrower and seller print the forms, sign the forms, print a shipping return label and send the signed forms to the service provider for processing. During the completion of the electronic forms, the website performs certain verification functions on the specific data fields being completed by the borrower and seller.

The service provider audits the information provided by the borrower and the seller for accuracy and completeness. The web-based embodiment for delivery of documents to the borrower and seller reduces the number of errors in borrower and seller packages received by the service provider because the website performs a form verification process prior to permitting the printing of the forms by the borrower and seller. If the information provided by the borrower and the seller appears correct and complete, the service provider informs the lender that it is acceptable to fund the loan to the borrower. The service provider supplies a web-based loan-funding-disbursement form instructing the lender how much to fund each party to the transaction. Interested parties who may receive disbursements from the lenders include pre-existing lienholders, the borrower, the seller and the service provider.

Upon receiving loan disbursement instructions from the service provider, the lender will disburse the loan amount, directly to the borrower, seller and/or to a lienholder if the vehicle is subject to a pre-existing lien. The disbursement will contain a restrictive endorsement tied to a seller and borrower promise to secure the loan with a lien on the vehicle.

The service provider obtains the certificate of title to the vehicle and subsequently records a public lien on the vehicle in favor of the lender, typically by submitting an application for certificate of title and recordation of lien to an appropriate governmental entity or jurisdiction. In jurisdictions that require the borrower to submit the application for title personally, the service provider monitors to confirm that the borrower submits the application for the title and records the lien. Depending upon the specific requirements of the governmental entity to which the application for certificate of title is submitted, upon completion of processing the application for certificate of title and recordation of lien by the governmental entity, the governmental entity will mail the completed certificate of title to the lienholder or will mail the completed certificate of title to the purchaser with a notation on the certificate of title indicating the presence of a lien in favor of the identified lender.

In one embodiment, the service provider supplies an internet website for estimating and/or quoting the cost for a borrower to pay a tax on the purchase of a vehicle and to register and purchase tags for the vehicle, which is referred to as a tax and tags quoting system. The tax and tags quoting system permits a lender's loan officers to calculate an estimate of the cost to the borrower for tax and tags on the vehicle. The estimated cost for the tax and tags on the vehicle can be included in a loan to the borrower to use for purchasing the vehicle and paying the tax on the purchase and for buying tags for the vehicle.

Thus, the total loan amount that the lender gives to the borrower includes not only the purchase price of the vehicle, but also the cost that the borrower will incur for tax and tags. In this manner a long-standing problem is resolved for borrowers and lenders both. Borrowers often did not and do not have the money needed to pay for taxes and tags associated with purchase of a vehicle. Lenders generally extended offers to loan money for just the purchase price of the vehicle, while borrowers often wanted to also borrow money for the tax and tags. In addition to the limitation of providing financing for the tax and tags amount, the historical practice of publicly recording the lien on the vehicle for the lender involved the lender providing instructions to the borrower to perform the public certificate of title application and lien filing duties. This practice, when combined with the inability of the lender to finance the amount of the taxes and tags resulted in great exposure to lenders as many borrowers simply did not perform the public certificate of title application and lien filing duties. The lenders therefore, were not obtaining public lien filings on their collateral. Using the present invention, the loan officer can calculate the cost for tax and tags and add this amount in the total amount financed by the borrower. The borrower is then able to also borrow money for paying the tax on the purchase and for buying tags to register the vehicle, and the lender is able to perform the public certificate of title application and lien filing duties on behalf of the borrower as a service to the borrower.

In another embodiment of the present invention, the service provider supplies an internet website for tracking the status of work in progress, which can be monitored by the lender. This internet website is preferably the same website as is used to provide the tax and tags quote. Preferably, the service provider's website further provides tracking of the collateral used to secure the lien.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

The present invention has applications in various situations where a service provider provides services to a client, who in turn provides services to his or her own customers. Various types of labor-intensive services can be out-sourced to the service provider, who automates the services and works cooperatively with the client to serve the client's customers. The present invention particularly has applications in lending-borrowing transactions and in recording documents for public notice. In one embodiment, where the client is a lender, who lends money to a borrower for purchase of property, the client out-sources to the service provider the handling of documents to be executed by the borrower, tracking the documents, and recording a lien on the property. A preferred embodiment of the present invention is described below and relates to providing services to a lender, particularly concerning loans and liens on vehicles and more particularly to financing of an automobile purchase and securing a public lien on a certificate of title evidencing ownership of the automobile, which serves as collateral to secure the loan.

Figure 1:
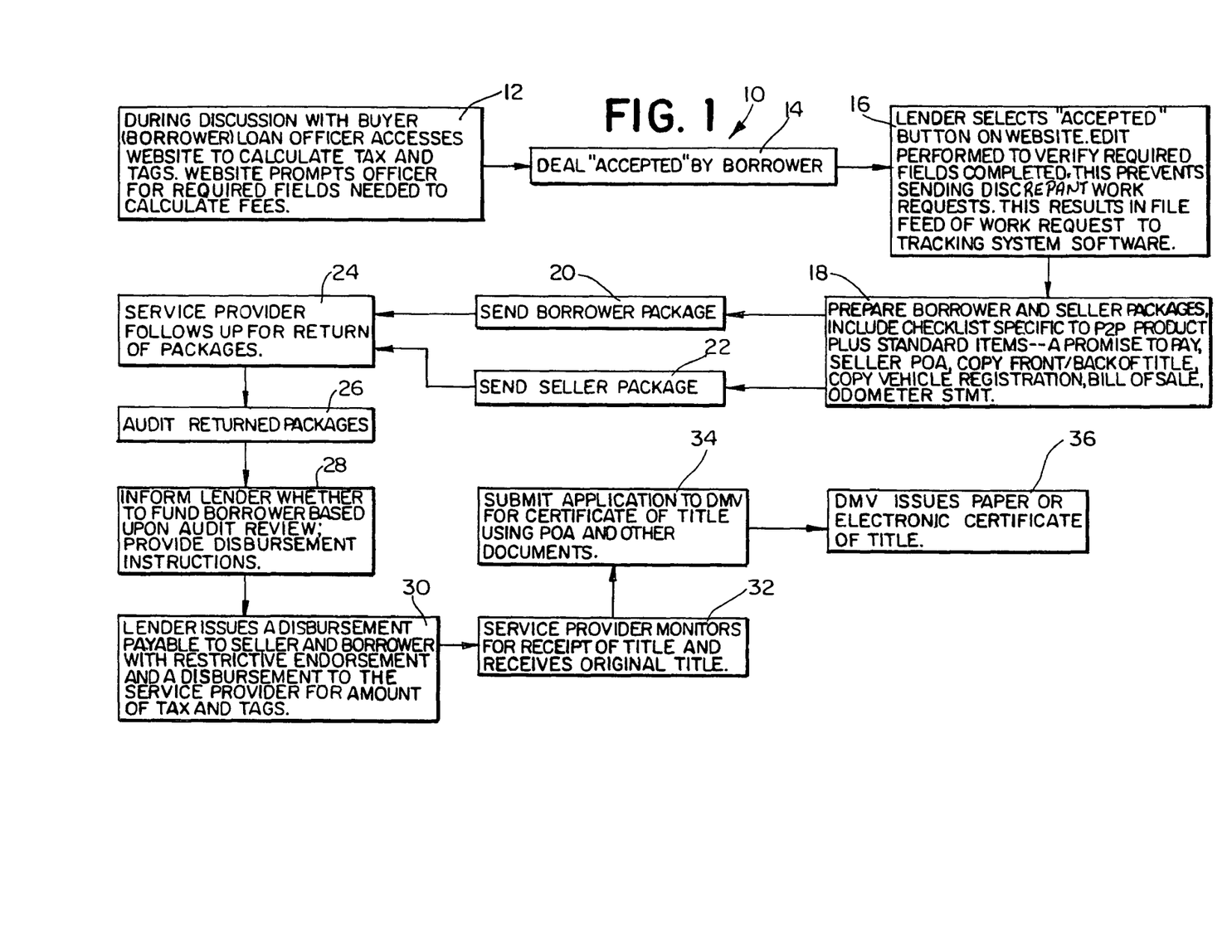
FIG. 1 provides a schematic flow diagram of steps in a method for serving a lender, who wishes to make a loan to a borrower to purchase a vehicle, where there is no pre-existing lien on the vehicle, according to the present invention.

Turning now to the drawings, FIG. 1 provides a schematic overview of a method 10 for processing a loan application, where a borrower/buyer, who wishes to borrow money, purchases a motor vehicle from a seller, who may be a dealer, an individual, a fleet organization or a leasing company. In method 10, the seller owns the vehicle free and clear of any pre-existing encumbrance so there is no pre-existing lien on the vehicle. The borrower approaches a lender, which may be a bank, credit union, finance company or other entity, and asks to borrow money for the purchase of the vehicle. Briefly, the lender and the borrower need to agree on terms, the borrower needs to purchase the vehicle, and the lender needs to obtain a public lien on a certificate of title evidencing ownership of the vehicle so that in the event the borrower fails to repay the loan, the lender can take possession of the vehicle, sell it and utilize the proceeds from the sale to repay the loan. Ownership of the vehicle is evidenced by a certificate of title to the vehicle, which is issued by a jurisdictional or governmental department of motor vehicles, referred to as the DMV. Liens on the vehicle are recorded at the DMV.

With reference to FIG. 1, the loan-processing method 10 provides an overview of the steps involved in the workflow for making a person-to-person loan where there is no pre-existing lien. Method 10 comprises a number of steps leading from initial discussions between the lender and the borrower to a secured financing of the vehicle for the borrower by the lender. During a discussion and negotiation between the buyer or borrower and the lender or its loan officer, the loan officer accesses, via a computerized communications network referred to as the internet, a tax and tags expense calculator module, referred to as the tax and tags module, which is provided by a third-party service provider. The tax and tags module allows the loan officer to closely estimate the expense that the borrower will incur in paying a sales tax on the purchase of the vehicle and for cost of registering ownership of the vehicle with the DMV in the borrower's name, the cost of obtaining license plates where required as well as publicly recording a lien on the certificate of title in favor of the lender.

In the past, the loan amount typically did not include the tax and tags expense, in which case the borrower had to pay the tax and tags expense from non-borrowed funds. Also in the past, the lender may have loaned an amount to cover the tax and tags expense but not had a security interest in the vehicle for the tax and tags expense amount. With the present invention, the loan officer accesses the service provider's web-based tax and tags module, inputs information concerning the vehicle, its owner and the jurisdiction, and the tax and tags module calculates in step 12 the anticipated expense that the borrower will incur at the DMV as a tax on the purchase and for registering the change in ownership of the vehicle, publicly recording the lien on the certificate of title in favor of the lender and obtaining license plates where required.

After the tax and tags expense calculation step 12, the loan officer can offer a loan amount to the borrower that includes funds for paying the tax and tags expense with terms for an interest rate, providing the borrower with an amount and number of monthly payments. The buyer/borrower can accept the terms offered by the lender's loan officer in step 14, after which the loan officer communicates the acceptance in step 16 to the service provider through internet or web-based communications software.

The acceptance in step 14 opens a work request for the service provider, and the service provider's web-based software checks the work request to confirm that all required information was entered in the tax and tags expense calculation step 12. In a package preparation step 18, the service provider prepares a package of information and documents to send to the borrower and a package of information and documents to send to the seller. The borrower's package of documents includes a state-specific checklist for the borrower of documents that the borrower needs to execute and/or tasks that he or she needs to complete. The borrower's package includes a power of attorney ("POA") in which the borrower gives the service provider the right and power to represent him or her before the DMV with respect to the application for certificate of title evidencing ownership of the vehicle and public recordation of a lien on the certificate of title evidencing ownership of the vehicle and any other DMV related tasks. The borrower's package further includes an odometer statement, a bill of sale, a promise to pay the lender the loan amount and any other forms required by the borrower's jurisdiction as dictated by the borrower's place of residence.

Similar to the borrower's package, the seller's package of documents includes a state-specific checklist for the seller of documents that the seller needs to execute and/or tasks that he or she needs to complete, an odometer statement and a power of attorney. The seller's package further includes a request for either the actual title to the vehicle or a copy of the front and back of the title to the vehicle to confirm no pre-existing lien is in place, a copy of the vehicle's registration document, and an executed bill of sale for selling the vehicle to the borrower.

Each of the borrower's and the seller's packages include a transmittal letter and are indexed to an account number that the lender assigns to the loan to the borrower, which is captured in the service provider's tracking software. The borrower's package identifies the borrower's responsibilities. In step 20 the borrower's package is sent to the borrower using a courier service such as Federal Express, United Parcel Service or DHL. (It may be possible to use the U.S. Postal Service's express mail courier service if data can be exchanged as described below.) A status alert is set in the service provider's tracking software for "borrower package outstanding" when the borrower's package is handed over to the courier. An automated communications link between the service provider and the courier allows the service provider to monitor the status of the borrower's and seller's packages and indicate the status of each in the service provider's tracking software.

Continuing to reference FIG. 1, the seller's package is sent to the seller in a step 22, preferably at the same time as the borrower's package is sent. Like the borrower's package, the seller's package and forms are indexed to an account number that the lender assigns to the loan to the borrower and that information is fed into the service provider's tracking software. A status alert is set in the service provider's tracking software for "seller package outstanding" when the seller's package is handed over to the courier. The outbound shipping time and date is electronically "stamped" into the service provider's tracking software, changing the status of the seller's package to indicate it is outstanding. When the borrower's and seller's packages are delivered, the courier's tracking software gets a record of the delivery, which is fed into the service provider's tracking software, and a change of status is indicated in the software. The lender, as well as the service provider, can thereby check the status of the packages at any time during the process.

Each of the borrower's and seller's packages includes a return courier envelope addressed to the service provider and is indexed to the borrower's account for tracking purposes. Delivery of the packages sets a clock ticking for follow up via a tickler or reminder system. When the borrower and seller return their packages using the return envelopes, the events are captured in the courier's software, and the information is linked for a feed into the service provider's tracking software, and a status in the tracking software is updated accordingly. When the service provider receives the packages back from the borrower and from the seller, another update is made in the tracking software. If packages are not received back in a pre-determined time, in step 24 the service provider's personnel contact the recipient of the outstanding package and inquire as to why it has not been returned. While administrative issues can be handled by the service provider's personnel, issues concerning the agreement between the lender and the borrower are preferably handed off to the lender.

The service provider audits the returned packages in step 26, confirming by visual inspection that the documents have all of the required signatures. Compliance with the checklist for the package is verified. Receipt of the following documents is confirmed: odometer disclosure statement; photocopies of driver license, registration, insurance, and front and back of the title; DMV submission forms; photocopies[Ih2] of receipt of filing; executed POA; and a promise to pay document executed between the lender and the seller. Upon receipt of the borrower's package, its status is changed to indicate it was received and similarly for the seller's package. The service provider's staff follows up on unreturned and incomplete packages, as well as on errors or omissions in the packages. At each step in the process, the status of each package is recorded in the tracking software, which the lender can review. Reports can also be provided to the lender.

After the audit is complete, the service provider informs the lender in step 28 whether to issue the loan amount to the borrower. If the audit indicates that documents have not been signed or tasks not completed, then a status notice to that effect is activated by personnel in the tracking software, and the lender knows not to issue the loan proceeds. If all the documents have been executed and all the required tasks completed, then the lender is informed that all is in order for funding the loan. The lender is given disbursement instructions by the service provider. This communication to the lender can be done several ways. In one embodiment, the service provider prepares a paper-based form containing disbursement instructions and sends the form to the lender via overnight courier. In another embodiment, the service provider completes a web-based disbursement instruction worksheet. The lender is informed of the availability of the web-based worksheet and logs onto the service provider's internet-based website and views and prints the disbursement instructions. When the lender receives the disbursement instructions, the lender issues the disbursement in step 30 payable to the seller with a restrictive endorsement concerning the lender acquiring a security interest in the vehicle as collateral for the loan and a disbursement to the service provider for the amount of tax and tag fees.

The service provider monitors for receipt of the title and receives the original title to the vehicle in step 32. The service provider submits an application to the DMV in step 34 for a certificate of title evidencing ownership of the vehicle by the borrower and to publicly record a lien on behalf of the lender. The application includes funds for the sales tax on the purchase of the vehicle and fees obtained from the lender for registering the vehicle in the borrower's name as well as for recording the lien. The lender funds the expense for the tax and tags and includes the amount in the amount of the loan made to the buyer/borrower. In those jurisdictions that require physical delivery of the application documents, the service provider monitors and notes when the submission is made. Depending upon the regulations of the specific jurisdiction, the DMV issues the certificate of title evidencing ownership of the vehicle by the borrower and containing a notice of a lien in favor of the lender in step 36. The certificate of title may be a paper certificate of title or it may be an electronic version of a certificate of title, referred to as an e-title. Depending upon the regulations of the jurisdiction, the lender holds the certificate of title until the borrower pays off the loan, after which the lender evidences release of the lien on the certificate of title evidencing ownership of the vehicle and gives the certificate of title to the borrower, assuming the borrower continues to own the vehicle until the loan is paid off in full. The workflow is thus complete for a person-to-person loan, where the seller does not have a prior lien on the vehicle.

Figure 2:
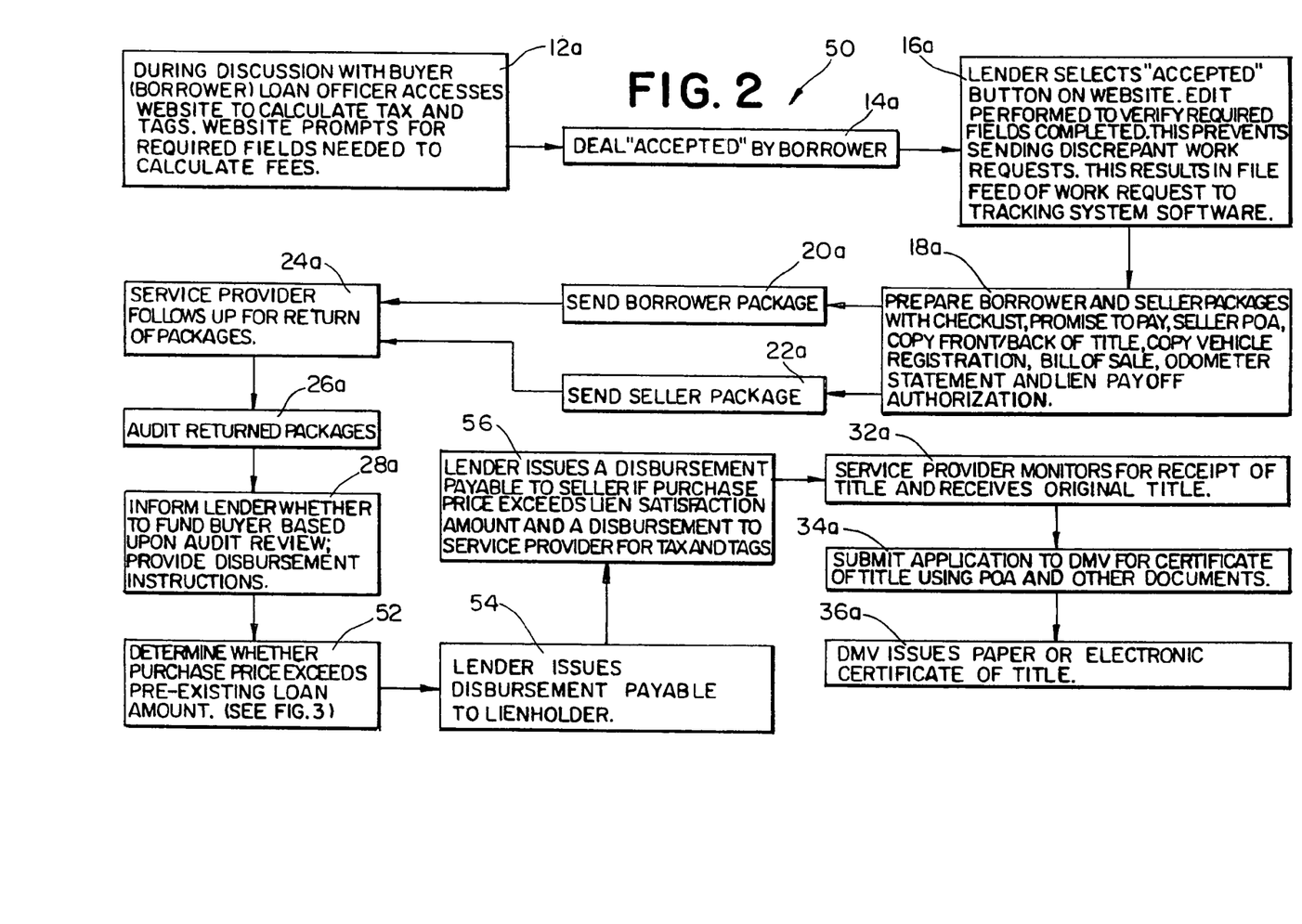
FIG. 2 provides a schematic flow diagram of steps in a method for serving a lender, who wishes to make a loan to a borrower to purchase a vehicle, where there is a pre-existing lien on the vehicle, according to the present invention.

Turning now to FIG. 2, a loan processing method 50 is shown schematically according to the present invention for workflow in a person-to-person loan where there is a pre-existing loan and lien. While method 10 in FIG. 1 did not have a pre-existing lien on the vehicle being purchased, loan processing method 50 includes steps for paying off a lienholder on the vehicle being purchased. Many of the steps in loan processing method 50 in FIG. 2 are essentially the same as the steps in loan processing method 10 of FIG. 1. The similarity between the steps in the processes has been indicated by using the suffix "a" on similar steps. With this in mind, method 50 includes a tax and tags expense calculation step 12a, which corresponds to the tax and tags expense calculation step 12 in FIG. 1. Likewise, steps 14a through 28a in method 50 correspond to like steps 14 through 28 in method 10 and so forth.

While the tax and tags expense calculation step 12a is the same as step 12 in FIG. 1, it will be covered in more detail here. In steps 12 and 12a, the lender's loan officer accesses the service provider's web-based software for calculating the expense that will be incurred at the DMV for sales tax, application for certificate of title evidencing ownership of the vehicle, obtaining license plates where required and publicly recording a lien in favor of the lender. At the tax and tags website, the loan officer is required to provide certain information. The loan officer is required to select the loan product being offered to the borrower, the type of transaction to be performed and the jurisdiction in which the transaction occurs. The tax and tags website software is configured to prompt the user for certain required fields, such as for the vehicle identification number or VIN, the owner's name, address, date of birth or DOB, and his or her insurance and driver's license information. The loan officer is asked to provide an application or account number, which is a unique identifier for each borrower applicant, information concerning the lienholder if there is one and other information specific to the loan product, the transaction to be performed and the jurisdiction. The tax and tags website software preferably includes the following functions: calculate estimate, save estimate, cancel or delete, update, accept and query functions such as to find a saved application.

When the loan officer and the borrower have agreed to terms in step 14a and the loan officer accepts the quote provided by the tax and tags website software in step 16a, the software or a related software module is preferably configured to automatically generate the borrower and seller packages in steps 18 and 18a. A Lien Payoff Authorization form is included in the seller's package that instructs a pre-existing lienholder, upon receipt of payment by the lender, to release the lien on the certificate of title held by the pre-existing lienholder, or to issue a lien-release letter and to forward the certificate of title and other lien-release documents directly to the service provider. In one embodiment of the invention, the borrower and seller packages are provided electronically, such as via display on a website, to the borrower and seller, respectively. In any case, the tax and tags website software is preferably linked to the service provider's tracking software, and the status of the workflow should be indicated and viewable using a computer or the like by service provider and lender personnel involved in the transaction.

Method 50 in FIG. 2 differs from method 10 in FIG. 1 after the packages have been audited in steps 26 and 26a and the lender has been informed in steps 28 and 28a as to whether it is appropriate to fund the loan amount. The disbursement instructions for the lender will be different in step 28*a* because the pre-existing lien of the other lender must be satisfied.

Figure 3:
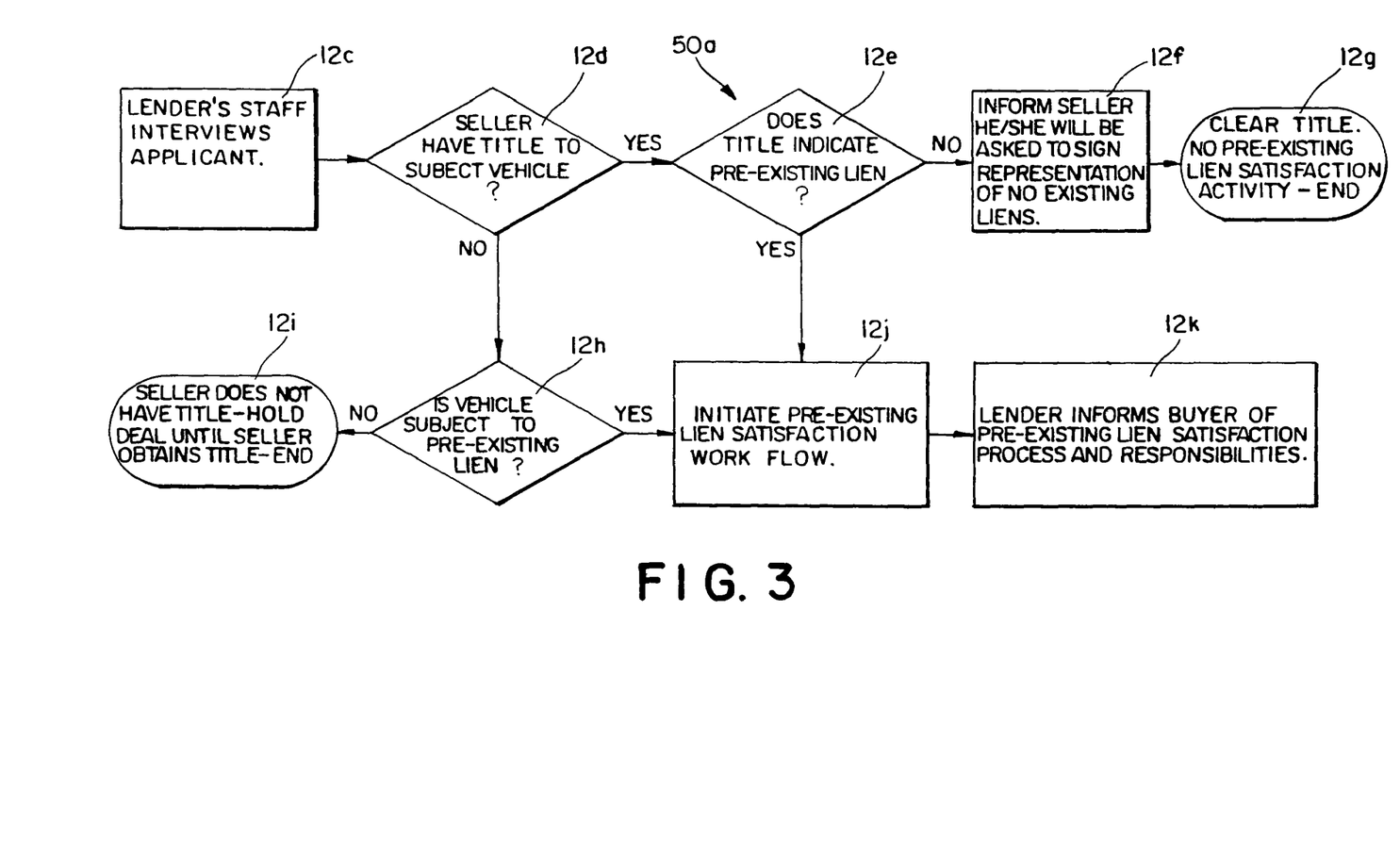
FIG. 3 provides a schematic flow diagram of steps in the method of FIG. 2 for satisfying a pre-existing lien, according to the present invention.

FIG. 3 provides a flow diagram for the steps considered in paying off a pre-existing debt on a vehicle that the lender's borrower wishes to buy. During the initial discussions in a step 12*c,* the loan officer will determine whether the vehicle is subject to a pre-existing lien. If there is a pre-existing lien, the loan officer will discuss the procedure for satisfying the seller's debt. The seller will be informed of the pay-off process to some extent by the borrower and will also receive information in the seller's package sent out in step 22*a.* The service provider will collect the information necessary to pay off the pre-existing lien, much of which should be in the package received back from the seller.

With reference to FIG. 3, a method 50*a* is provided for workflow for determining whether a pre-existing lien exists, and if so, for satisfying the pre-existing lien. The loan officer in step 12*c* asks the loan applicant, which is the buyer/borrower, whether the seller has title to the vehicle that the borrower wishes to purchase (step 12*d*). If the seller has the title, the loan officer determines in step 12*e* whether the title indicates that there is a pre-existing lien on the vehicle. If not, the seller will be asked to sign a document provided in the seller package representing that there is no lien on the vehicle (step 12*f*). With no pre-existing lien found to satisfy, in step 12*g* the title is believed to be clear, and the loan-application process proceeds as shown in FIG. 1.

If in step 12*d* it was determined that the seller did not have title to the vehicle, the loan officer determines in step 12*h* whether the vehicle is subject to a pre-existing lien. If the seller does not have title and there is no pre-existing lien, the application process is put on hold in step 12*i* until the seller obtains the title to the vehicle he or she wishes to sell to the buyer/borrower. If in step 12*h* the vehicle was found to be subject to a pre-existing lien, the loan officer initiates a pre-existing lien satisfaction workflow in step 12*j*. The loan officer explains to the borrower in step 12*k* the process for satisfying the pre-existing lien and the borrower's and seller's responsibilities for paying off the prior loan amount and clearing the prior lien.

The loan officer, the buyer/borrower and the seller implement a number of steps in determining whether there is a pre-existing lien, and if so, satisfying the prior lien. Between the lender/loan officer and the buyer/borrower, the loan officer: (1) determines the title status of the seller during the application interview (step 12*c*); (2) informs the buyer of the payoff process and funding flow (step 12*k*); and (3) informs buyer of seller and applicant documents to be sent in package to be executed. Between the buyer/borrower and the seller, the buyer: (1) determines the title status from seller; (2) obtains payoff information from the seller, if the title is currently encumbered; (3) informs the seller about the payoff process and the funding flow; (4) informs the seller about the documents in the seller's package that the seller will receive and needs to execute. Between the service provider and the borrower, the service provider: (1) sends the buyer package to the borrower; (2) requests seller lien payoff information and seller contact information; (3) requests return receipt within 24 hours; and (4) tracks receipt and follows up on returns. Between the service provider and the seller, the service provider: (1) waits for return of the buyer's package; (2) accumulate lien payoff information and prepares seller payoff authorization; (3) sends seller package to seller, the package containing a lien payoff authorization form for the seller to sign and return to the service provider; and (4) tracks receipt and follows up on return of the seller package. Between the service provider and the prior lienholder, the service provider: (1) confirms lien payoff information; (2) audits seller and applicant/borrower/buyer packages; (3) and provides notes in a tracking software that the lender can access, where the notes enable the lender to confirm the payoff information.

Returning to FIG. 2, in step 52 the seller will determine the amount of the outstanding loan on his or her vehicle and report that to the service provider in one of the documents in the seller's package. During the audit 26*a,* the service provider contacts the pre-existing lienholder, confirms the amounts represented by the seller, determines whether the purchase price exceeds the amount of the outstanding loan that the seller owes, provides disbursement instructions 28*a* accordingly, and forwards the original Lien Payoff Authorization form to the lender to collate with its disbursement destined to a pre-existing lienholder. When all the documents are in order and/or executed, the lender will issue funds to the pre-existing lienholder in step 54. The lender will also include the original Lien Payoff Authorization form with its disbursement to the pre-existing lienholder. This form instructs the pre-existing lienholder to release the lien on the certificate of title held by the pre-existing lienholder, or to issue a lien release letter and to forward the certificate of title and other lien release documents directly to the service provider. If the borrower's purchase price exceeds the seller's outstanding loan amount, the lender will disburse the excess to the seller in step 56. The lender also issues a disbursement to the service provider for use in paying a tax and tags amount to the DMV.

The service provider monitors for receipt of the title and receives the original title to the vehicle in step 32*a.* The service provider submits an application to the DMV in step 34*a* for a certificate of title evidencing ownership of the vehicle by the borrower and to publicly record a lien on behalf of the lender. The application includes funds for the sales tax on the purchase of the vehicle and fees obtained from the lender for registering the vehicle in the borrower's name as well as for recording the lien. The lender funds the expense for the tax and tags and includes the amount in the amount of the loan made to the buyer/borrower, but disburses the funds to the service provider for payment to the DMV by the service provider. In those jurisdictions that require physical delivery of the application documents, the service provider monitors and notes when the submission is made. Depending upon the regulations of the specific jurisdiction, the DMV issues the certificate of title evidencing ownership of the vehicle by the borrower and containing a notice of a lien in favor of the lender in step 36*a.* The certificate of title may be a paper certificate of title or it may be an electronic version of a certificate of title, referred to as an e-title. Depending upon the regulations of the jurisdiction, the lender holds the certificate of title until the borrower pays off the loan, after which the lender evidences release of the lien on the certificate of title evidencing ownership of the vehicle and gives the certificate of title to the borrower, assuming the borrower continues to own the vehicle until the loan is paid off in full. The workflow is thus complete for a person-to-person loan, where there is a pre-existing lien on the vehicle.

Figure 4:
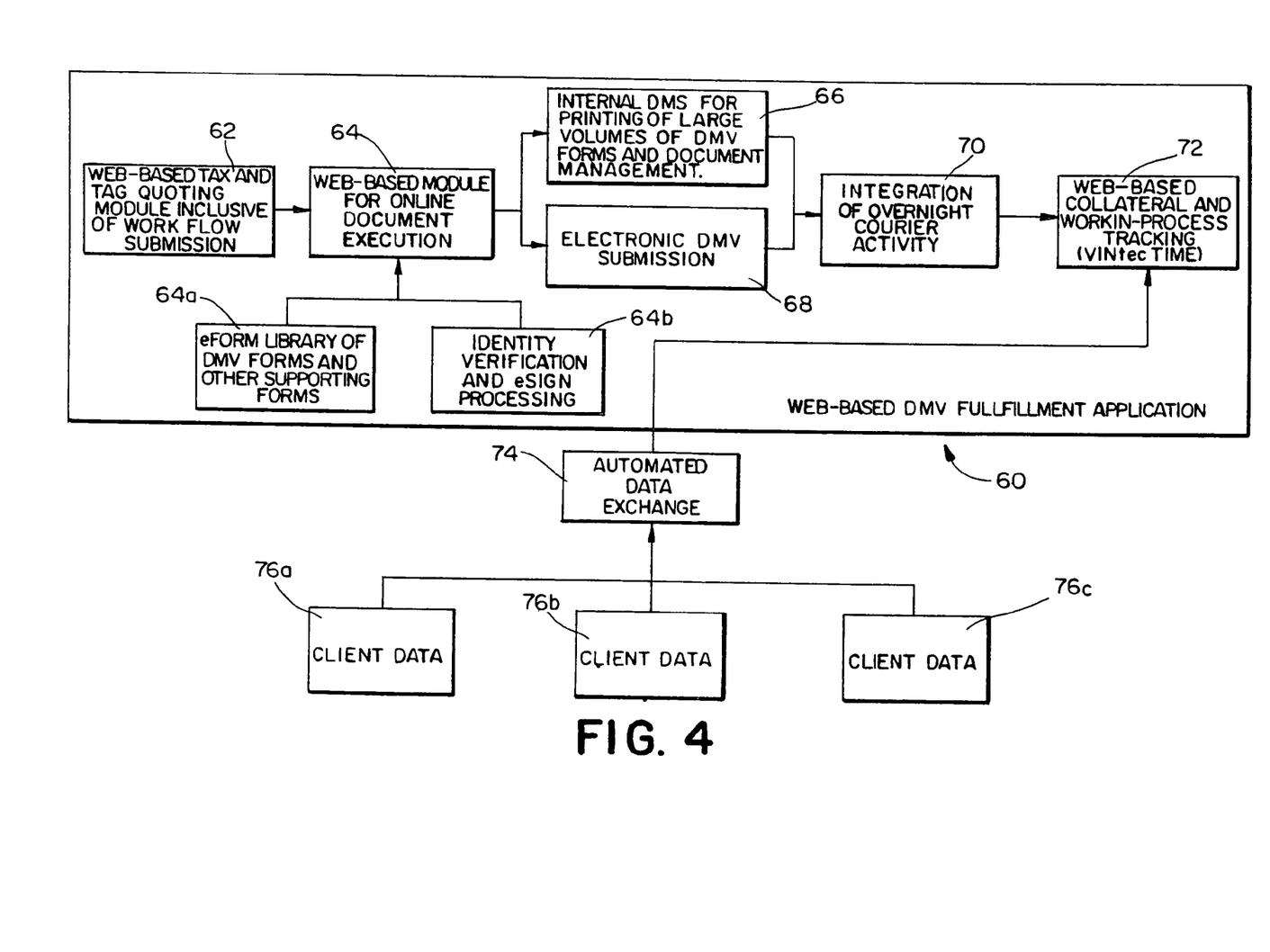
FIG. 4 provides a high-level overview of a system with application modules for implementing a method for serving a lender, who wishes to make a loan to a borrower to purchase a vehicle, including executing documents online and/or submitting documents electronically to a department of motor vehicles or similar agency, according to the present invention.

FIG. 4 provides a high-level overview of a computer and network system 60 running application modules that can be used to implement the present invention. In this embodiment, a service provider has a number of computers linked together in a network, which is connected to a worldwide network known as the world wide web on the internet. A tax and tags module 62 provides web-based calculation of a tax and tags estimate that a client can access via the internet for executing steps 12 and/or 12a. Tax and tags module 62 provides an interface for data communication between the service provider and the client.

The documents in the borrower and seller packages prepared in steps 18 and 18a in FIGS. 1 and 2, respectively, can be provided in an online document module 64 in FIG. 4 with documents and forms being supplied by a forms library module 64a. When the borrower or seller accesses the online document module, he or she will be queried for identification with the assistance of an identity verification module 64b. Identification can be provided through, for example, personal information, password or biometric information such as finger or voice print or eye or facial identification. After the online document module is satisfied that the person accessing the system is the proper person, an initial disclosure of financing charges can be provided and documents can be filled out and signed online through the internet or other electronic communication means such as a telephone network, possibly using voice-activated software on the online document website.

In one embodiment of online document module 64, the service provider supplies an internet website which presents to borrowers an electronic document version of the borrower package and presents to sellers an electronic version of the seller package. The borrower and seller complete electronic versions of the forms contained within the borrower and seller packages on a web page and upon completion of the electronic forms the borrower and seller print the forms, sign the forms, print a shipping return label and send the signed forms to the service provider for processing. During the completion of the electronic forms, the website performs certain verification functions on the specific data fields being completed by the borrower and seller. This eliminates the requirement of the service provider to send borrower and seller packages to borrowers and sellers via courier service (steps 20/22 and 20a/22a) and reduces the number of errors in borrower and seller packages received by the service provider because the website performs a form verification process prior to permitting the printing of the forms by the borrower and seller. Online document module 64 can also be configured to perform steps 18 and 18a to prepare documents for inclusion in borrower and seller packages for delivery by courier service as described with reference to FIGS. 1 and 2.

Online document module 64 in FIG. 4 feeds data into a document management system ("DMS") module 66 that the service provider also maintains. DMS module 66 is capable, when connected to a printer, of printing large volumes of documents, whether paper or electronic, such as DMV forms. Online document module 64 is preferably also linked to a governmental DMV that accepts submissions electronically via an electronic DMV submission module 68. In this manner the process for paying the tax associated with the purchase of a vehicle, requesting a certificate of title evidencing ownership in a vehicle, obtaining license plates where required and publicly recording a lien on the certificate of title can be automated with data flowing electronically between the lender, service provider and DMV, including a transfer of funds to the DMV from either the lender or the service provider.

For a DMV that requires some or all submissions to be on paper, DMV submission module 68, which may be web based but is preferably part of an intranet owned and managed by the service provider, is integrated with a courier service via an integration module 70. DMV submission module 68 is preferably configured to automatically generate the documents for the borrower and seller packages and the documents for submission to the DMV. Integration module 70, through integration between the courier service's computer system and the service provider's computer system, including its tracking software, obtains the date and time of outbound shipment of packages, proof of delivery, date and time when packages are returned by the borrower and seller and date, time and proof of delivery for submissions to the DMV.

All of this information is preferably fed into a tracking software module 72 operated by the service provider, which can be web-based or on an internal intranet, such as a client-server system, for tracking collateral and work-in-process. Suitable tracking software is available from Vintek, Inc. of Philadelphia, Pa. under the brand name VINtekTIME. The service provider's tracking software module 72 communicates with or is integrated with a client's computer system, such as the lender's intranet with numerous computers, via an automated data exchange module 74. Service can be provided for numerous clients by integrating client data systems with automated data exchange module 74 using interfaces such as client data modules 76a, 76b and 76c. A client's data on its various computers on its intranet feeds (through client data module 76 to automated data exchange module 74) information into the service provider's computer system, particularly to its tracking software module 72. For example, through this data flow in client data module 76, a lender can notify the service provider of receipt of a certificate of title with a publicly recorded lien in the lender's favor. Automated data exchange module 74 is used to provide notification to tracking software module 72 when titles have been received either by clients or by the service provider.

Tracking software module 72 is preferably configured to indicate where in the process a particular loan is. Various codes can be used to indicate the status of a loan. In one embodiment the codes include: WIP for work in process and indicating that no discrepancies currently exist; WRR for work request received by the service provider; WRD to indicate work request discrepancies were found by the service provider preferably using automated software and computer techniques; BPO to indicate the borrower's package is outstanding; SPO for the seller's package outstanding; BPR to show the service provider received the borrower's package; BPD for borrower package discrepant; TPL for title pending from a pre-existing lienholder; TTE for a tax and tags error; SUB for paperwork submitted to the proper DMV; and REJ to indicate a submission was rejected by the DMV and requires follow up.

Methods and systems have thus been described for a service provider to provide services to a client, where the client outsources to the service provider certain tasks that might otherwise be performed by the client and/or by a customer of the client. In the present invention, labor-intensive tasks in a service industry are automated by a service provider, who then offers the automated services to clients, who in turn provide services for the clients' customers. If the client has a significant amount of routine communication and execution of documents among its various customers, then the service provider can help the client by communicating directly with the client's customers on behalf of the client and by providing documents to the customer for execution. The service provider can also provide information, such as a computing service or an estimator service, to the client, where the client can access and interact with a web site provided by the service provider. If the client's customer's business with the client involves a third party, such as the seller in the embodiments described above, the service provider can communicate directly with and provide paper and/or electronic documents to the third party. If the client's customer's business with the client involves a fourth party, such as the DMV described in the embodiments above, the service provider can communicate directly with and provide paper and/or electronic documents to the fourth party. The service provider is preferably a for-profit entity that earns revenue from its clients based on services provided to its clients. In the embodiments described above, the clients are lenders to purchasers of goods that are identified by a certificate of title. However, the present invention has application for other clients, such as lenders for real property, automobile-leasing companies, office-leasing companies, airline-ticket vendors and entities that record UCC notices of liens on various goods. For issues concerning collateralized financing and UCC filings, where the present invention may be applied, see U.S. Pat. Nos. 5,323,315 and 5,623,403, each issued to Highbloom and each incorporated by reference.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for serving a lender concerning a loan transaction between the lender and a borrower, wherein the borrower is purchasing a motor vehicle from a seller, the method comprising:
providing a computerized calculation system that the lender can access to make an automatic calculation that determines a loan amount, wherein the calculation comprises calculation of an expense for a purchase of a motor vehicle, wherein the expense comprises at least one of sales tax, cost of registration, cost of license plates and cost of public recordation of a lien on title and the expense is included in the loan amount;
prompting the lender to enter information into the computerized calculation system concerning the transaction;
preparing documents for the borrower;
providing the documents to the borrower;
receiving the documents back from the borrower;
advising the client concerning the transaction, and
submitting required documents to a department of motor vehicles or similar agency, wherein the required documents are for at least one of paying a tax, applying for a certificate of title for ownership of the motor vehicle, obtaining license plates where required or publicly recording a lien for the loan amount.

2. The method of claim 1, wherein the documents provided to the borrower are electronic versions of paper documents, and wherein the documents are provided via an internet web site.

3. A method for serving a lender, loaning money to a borrower, wherein the borrower is purchasing something from a seller, the method comprising:
providing an internet, web-based calculation module for automatically determining an expense in addition to the sales price of an item being sold and associated with the purchase to enable the lender to secure an accurate lien including the sales price and the calculated expense, registration and/or recordation for the item being sold, wherein the lender can access and use the calculation module;
prompting the lender to enter information including geographic information into the calculation module concerning the borrower's purchase;
calculating the expense for the purchase using at least some of the information entered by the lender and providing the result to the lender;
receiving a communication from the lender that the lender and the borrower have reached an agreement; and
advising the lender concerning the agreement.

4. The method of claim 3, further comprising preparing and providing documents for the borrower.

5. The method of claim 4, further comprising preparing and providing documents for the seller.

6. The method of claim 3, further comprising preparing and sending documents to a governmental entity concerning the agreement between the lender and the borrower.

7. A method for providing service to a lender lending loan money to a borrower, wherein the borrower is purchasing a motor vehicle from a seller, the method comprising:
providing a computerized calculation module for automatically determining an expense for the purchase, wherein the expense includes a tax or other cost for the purchase or registration of the motor vehicle, and wherein the lender can access and use the calculation module;
prompting the lender to enter information including geographic information into the calculation module concerning the vehicle;
calculating the expense for the purchase and providing the result to the lender;
providing a tracking software module, wherein the lender can send communications to and receive communications from the tracking software module;
receiving an agreement communication from the lender that the lender and the borrower have reached an agreement on a loan amount and terms for a loan, wherein the loan amount includes the expense;
noting the agreement communication in the tracking software module;
preparing borrower documents;
providing the borrower documents to the borrower;
preparing seller documents;
providing the seller documents to the seller;
receiving the borrower documents from the borrower, wherein the borrower documents have been executed by the borrower;
receiving the seller documents from the seller, wherein the seller documents have been executed by the seller;
auditing the executed borrower and seller documents for errors or omissions; and
advising the lender as to whether to fund the loan to the borrower.

8. The method of claim 7, further comprising providing disbursement instructions to the lender.

9. The method of claim 8, further comprising determining whether there is a pre-existing lien on the vehicle.

10. The method of claim 9, wherein there is a pre-existing lien amount on the vehicle, and further comprising determining whether the loan amount exceeds the lien amount.

11. The method of claim 10, further comprising instructing the lender to pay the pre-existing lien amount to a lienholder who holds the lien on the vehicle.

12. The method of claim 11, wherein the loan amount exceeds the pre-existing lien amount, and further comprising instructing the lender to disburse funds to the seller in an amount equal to the amount that the loan amount exceeds the pre-existing lien amount.

13. The method of claim 7, further comprising preparing DMV documents.

14. The method of claim 13, further comprising sending the DMV documents to a governmental entity that regulates the purchase of the vehicle.

15. The method of claim 13, further comprising submitting the DMV documents to a governmental entity that regulates the purchase of the vehicle, wherein the documents are submitted electronically.

16. A system for providing services to a client, wherein the client has a customer and the customer has a transaction with the client, comprising:
 - a first computerized module for providing information to the client, wherein the first computerized module includes a calculation module for automatically calculating an expense for a transaction between the client and the customer, wherein the expense varies with the transaction and its geographic location;
 - a second computerized module for providing information to the customer, wherein the second computerized module is integrated with the first computerized module;
 - a document management module for managing documents and/or printing forms, wherein the document management module is integrated with the second computerized module;
 - a courier integration module adapted for integrating computerized data in a courier service entity's system with the document management module;
 - a tracking module for tracking work-in-process, wherein the tracking module is integrated with the courier integration module and/or the document management module; and
 - an automated data exchange module adapted for receiving data from a computerized system operated by the client and for exchanging information with the tracking module.

17. A method for providing services to a client, wherein the client has a customer, the client is contemplating a transaction with the customer, and the client and the customer have a need to provide information to a third party concerning the transaction, the method comprising:
 - providing information to the client via a computerized system and/or through a network of computers, wherein the client requests the information through the computer system and/or through the network of computers, wherein the information includes automatically calculated information for an expense for the purchase which expense varies with the transaction and its geographic location;
 - receiving client-customer information from the client concerning a proposed transaction between the client and the customer;
 - providing service provider-customer information to the customer;
 - receiving customer-service provider information from the customer concerning the service provider-customer information;
 - advising the client to implement the transaction between the client and the customer; and
 - providing service provider-third party information to the third party concerning the transaction between the client and the customer.

18. The method of claim 1, further comprising providing disbursement instructions to the lender.

19. The method of claim 18, further comprising determining whether there is a pre-existing lien on the vehicle.

20. The method of claim 19, wherein there is a pre-existing lien amount on the vehicle, and further comprising determining whether the loan amount exceeds the lien amount.

21. The method of claim 20, further comprising instructing the lender to pay the pre-existing lien amount to a lienholder who holds the lien on the vehicle.

22. The method of claim 7, wherein the expense comprises at least one of sales tax, cost of registration, cost of license plates and cost of public recordation of a lien on title.

* * * * *